Figure 3:
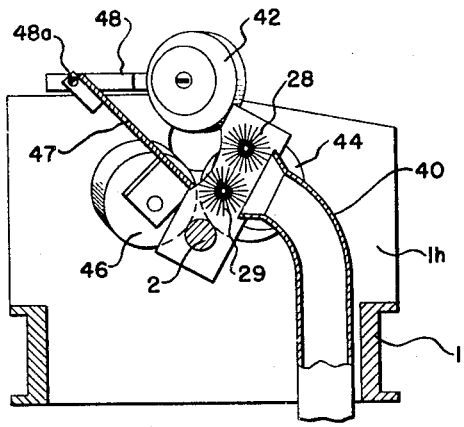

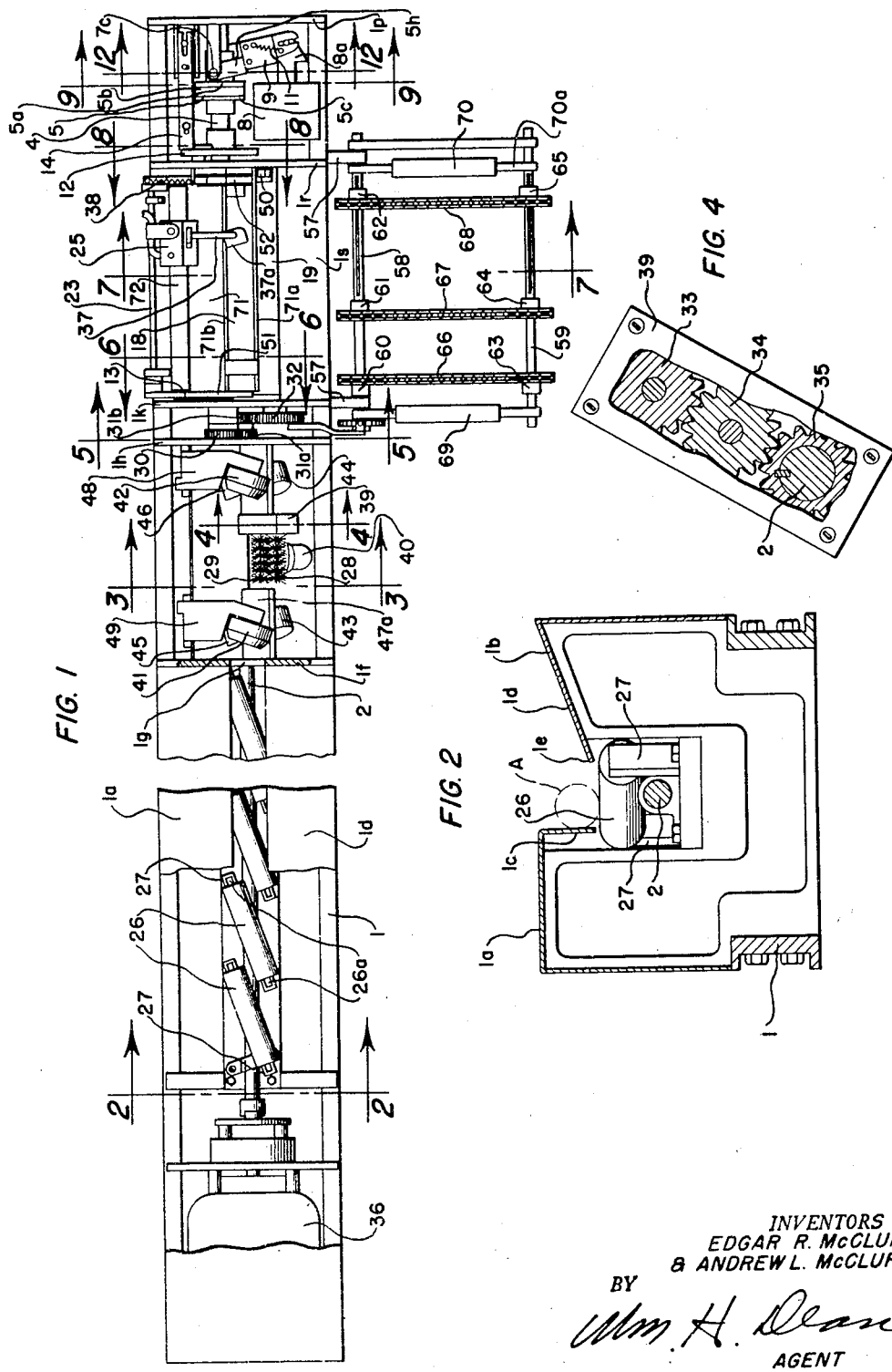

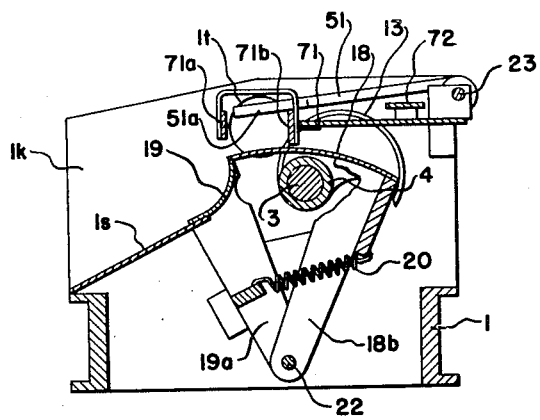
FIG. 6
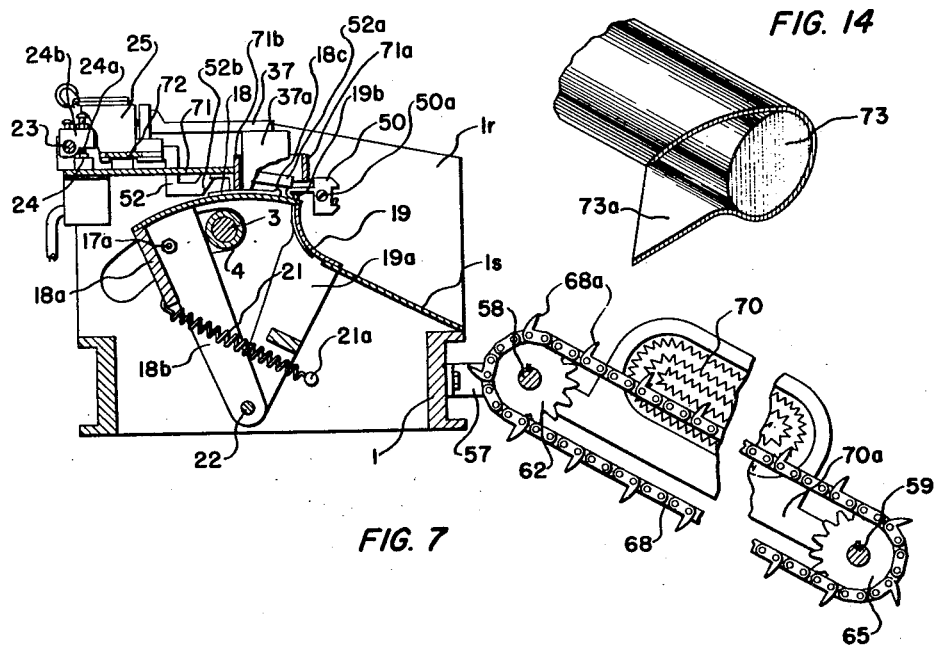
FIG. 7
FIG. 14
INVENTORS
EDGAR R. McCLURE
& ANDREW L. McCLURE
BY
Wm. H. Dean
AGENT July 11, 1950   E. R. McCLURE ET AL   2,514,660
MEANS OF PRODUCING FRANKFURTERS
Filed July 21, 1947   5 Sheets-Sheet 4

INVENTORS
EDGAR R. McCLURE
& ANDREW L. McCLURE
BY
Wm. H. Dean
AGENT

July 11, 1950 E. R. McCLURE ET AL 2,514,660
MEANS OF PRODUCING FRANKFURTERS
Filed July 21, 1947 5 Sheets-Sheet 5
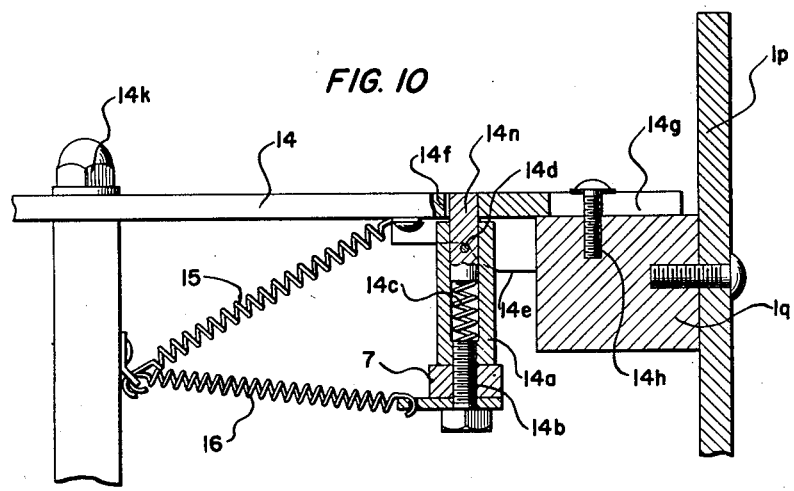
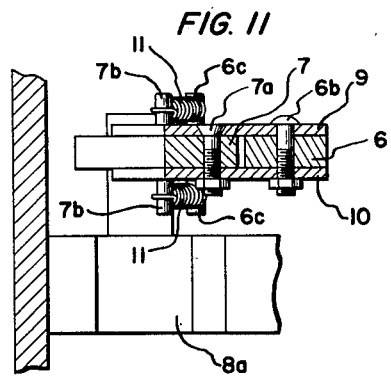
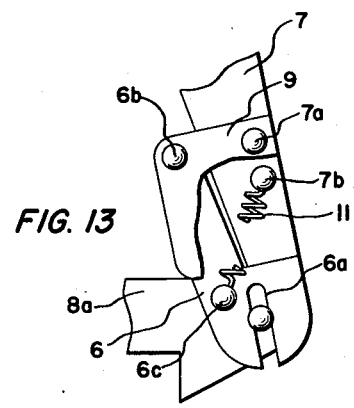
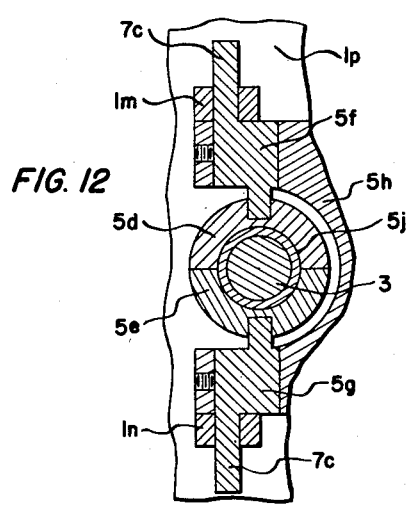
INVENTORS
EDGAR R. McCLURE
& ANDREW L. McCLURE
BY
Wm. H. Dean
AGENT Patented July 11, 1950

2,514,660

UNITED STATES PATENT OFFICE 2,514,660

MEANS OF PRODUCING FRANKFURTERS

Edgar R. McClure and Andrew L. McClure,
San Diego, Calif.

Application July 21, 1947, Serial No. 762,424

14 Claims. (Cl. 17—1)

Our invention relates to a means and method of producing frankfurters and the objects of our invention are:

First, to provide a method of this class in which sausage may be stuffed in long sections and processed in lengths up to 6 to 8 feet eliminating the conventional linking operations;

Second, to provide a method of this class in which the stuffed casings may be hung in relatively long lengths over conventional S-hooks and may be completely processed in such condition whereby said sausages remain relatively straight to which our means for producing frankfurters is adapted;

Third, to provide a means for producing frankfurters of this class which accommodates long straight sections of sausage and cuts the same into short lengths during which it automatically removes the casing therefrom;

Fourth, to provide a method of this class which lends itself to the continuous operations of drying, smoking and cooking sausages;

Fifth, to provide a means and method of this class which eliminates the hand skinning of sausages;

Sixth, to provide a means and method of this class which produces short sausages ready for use which are straight and conveniently packed into a neat package for the consumer.

Seventh, to provide a means and method of this class which saves the sausage casings, because the linking of sausage is eliminated, which linking normally uses considerable lengths of the casing.

Eighth, to provide a means and method of this class which produces straight sausages which greatly facilitates the packing and handling of said sausage, both by the producer and consumer.

Ninth, to provide a means and method of this class which produces sausages ready for the consumer which have uniform length and square ends.

Tenth, to provide a means and method of this class which increases production volume of sausages within a given floor space.

Eleventh, to provide a means and method of this class which greatly reduces the cost of producing sausages by saving considerable labor.

Twelfth, to provide a method of this class which particularly reduces labor in hanging sausage before the processing thereof.

Thirteenth, to provide a means and method of this class in which it is necessary to make only one tear of the casing at the end of a long section of sausage for removing the casing from the sausage which is relatively simple compared to the removal of individual casing sections from numerous lengths of sausage.

Fourteenth, to provide a means of this class in which even tearing of the casing from the exterior of the sausage is accomplished by certain uniform pitch of rotation of said sausage past the casing removing brushes of said means.

Fifteenth, to provide a means of this class in which sausages are cut to a predetermined length, and the short and rounded ends are automatically disposed of, whereby all of the sausages delivered from said means are ready for packaging and delivery to the consumer.

Sixteenth, to provide a very novel method for producing frankfurters of this class, and Seventeenth, to provide a means for producing frankfurters of this class which is very simple and economical of construction, in proportion to its utility, efficient in its action and which will not readily deteriorate or get out of order.

Figure 5:
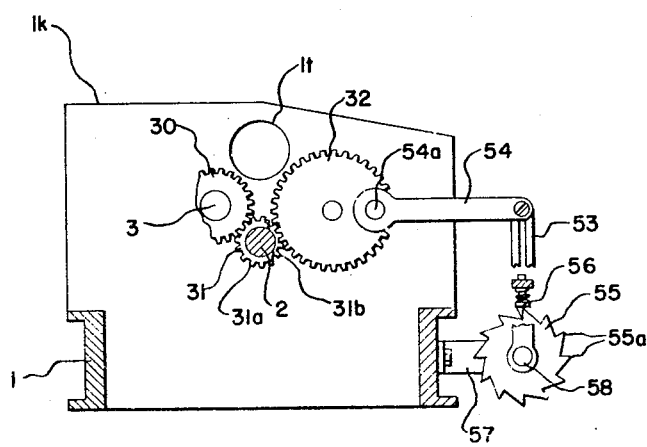
Figure 8:
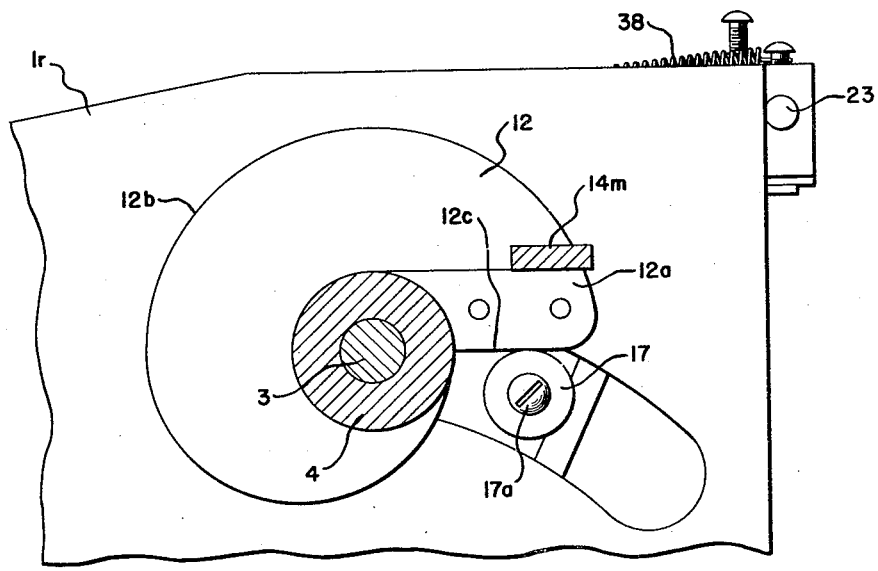
Figure 9:
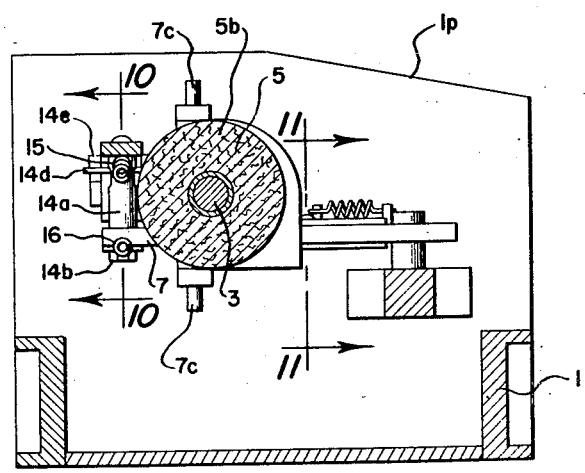

With these and other objects in view, as will appear hereinafter, our invention consists of certain novel features of construction, combination and arrangement of parts and portions and a certain method as will be hereinafter described in detail and particularly set forth in the appended claims, reference being had to the accompanying drawings and to the characters of reference thereon forming a part of this application in which: Figure 1 is a top or plan view of our means for producing frankfurters showing portions thereof broken away to facilitate the illustration; Figure 2 is an enlarged transverse sectional view taken from the line 2—2 of Figure 1 showing the structure on an enlarged scale; Figure 3 is an enlarged transverse sectional view taken from the line 3—3 of Figure 1; Figure 4 is an enlarged fragmentary sectional view taken on the line 4—4 of Figure 1; Figure 5 is an enlarged sectional view taken from the line 5—5 of Figure 1; Figure 6 is a transverse sectional view taken from the line 6—6 of Figure 1 showing the structure on an enlarged scale; Figure 7 is an enlarged transverse sectional view taken from the line 7—7 of Figure 1; Figure 8 is an enlarged fragmentary sectional view taken from the line 8—8 of Figure 1; Figure 9 is an enlarged transverse sectional view taken from the line 9—9 of Figure 1; Figure 10 is an enlarged fragmentary sectional view taken from the line 10—10 of Figure 9; Figure 11 is an enlarged fragmentary sectional view taken from the line 11—11 of Figure 9; Figure 12 is an enlarged fragmentary sectional view taken from the line 12—12 of Figure 1; Figure 13 is an enlarged fragmentary plan view of the clutch control levers of our means for producing frankfurters, and Figure 14 is a view showing the end portion of a long section of sausage having the casing started at the end thereof, ready for insertion in our means for producing frankfurters.

Similar characters of reference refer to similar parts and portions throughout the several views of the drawings.

The frame 1, main shaft 2, secondary shaft 3, hollow shaft 4, clutch 5, levers 6 and 7, solenoid 8, bearing plates 9 and 10, over travel springs 11, cam 12, knife 13, cam stop 14, springs 15 and 16, cam follower 17, ejector plates 18 and 19, springs 20 and 21, shafts 22 and 23, switches 24 and 25, feed rollers 26, roller bearings 27, brushes 28 and 29, gears 30 to 35 inclusive, motor 36, switch arm 37, spring 38, gear case 39, ducts 40, rollers 41 to 46 inclusive, roller frame 47, levers 48 and 49, latch 50, trip levers 51 and 52, lever 53, link 54, ratchet wheel 55, pawl 56, brackets 57, shafts 58 and 59, sprockets 60 to 65 inclusive, chains 66, 67, and 68, heating elements 69 and 70, guide plates 71, and the rail 72 constitute the principal parts and portions of our means for producing frankfurters.

The frame 1 of our means for producing frankfurters supports the operating mechanism thereof, at one end of which the motor 36 is connected to the frame 1 and drives the main shaft 2 extending longitudinally of said frame 1 as shown best in Figure 1 of the drawing. This motor 36 is preferably a reduction gear motor adapted to slowly rotate the main shaft 2. Resting on the main shaft 2 are the feed rollers 26. These feed rollers 26 as shown in Figs. 1 and 2 of the drawings, are angularly disposed to the axis of the shaft 2 and are each provided with trunnion portions 26a at their opposite ends which rest in the channel shaped roller bearings 27. These bearings 27 simply maintain the angular disposition of the rollers 26 and permit the entire weight of said rollers 26 to rest on the shaft 2 so that rotation of the shaft 2 caused by the motor 36 revolves said rollers 26. In connection with the frame 1 at opposite sides of the rollers 26 are cover plates 1a and 1b. The cover plate 1a is provided with a substantially vertical wall portion 1c, and the cover plate 1b is provided with an inclined portion 1d having its lower edge 1e disposed adjacent the rollers 26, providing a surface upon which lengthy sections of sausage may be rolled into substantially the dash line position A as indicated in Figure 2 of the drawings. It will be here noted that the rollers 26 and main shaft 2 extend a considerable distance along the frame 1 and accommodate relatively long sections of sausage. It is contemplated that certain divisions of the standard 32 foot casing length may be accommodated by the rollers 26, which, due to their angularly disposed relationship to the shaft 2, cause rotation and forward movement of a lengthy section of sausage resting thereon. The frame 1 is provided with a partition portion 1f having an opening 1g therethrough, arranged to receive a sausage which travels toward the rollers 41, 43 and 45. These rollers 41, 43, and 45 are angularly disposed to each other, and the rollers 43 and 45 are stationarily revolubly mounted in the roller frame 47. This roller frame 47 is provided with a trough portion 47a above which the roller 41 is freely pivoted on the lever 49, hinged to a shaft similar to the shaft 48a of the lever 48, as shown in Figure 3 of the drawing. Thus, the roller 41 is adapted to bear, by its gravitational character, on the upper side of the sausage, while the lower portions of the sausage are supported on the rollers 43 and 45 which are rotationally operated by frictional engagement with the main shaft 2, as shown in Figure 3 of the drawings. The rollers 44 and 46 are similar to the rollers 43 and 45 and the roller 42 is similar to the roller 41. These rollers 41 to 46 inclusive cause positive rotational and forward feed of the sausage longitudinally of the main shaft 2 and operate in unison with the rollers 26. Secured on the shaft 2, intermediate the rollers 41, 43, 45 and the rollers 42, 44, and 46, is the gear 35. This gear 35 meshes with the gear 34 meshing with the gear 33, all of which gears 33, 34 and 35 are supported in the gear case 39. Secured in connection with the gears 33 and 34 are the brushes 28 and 29 respectively which are substantially engaged at their peripheral portions. These brushes 28 and 29 operate adjacent the periphery of the sausage passing through our means for producing frankfurters, and these brushes 28 and 29 are arranged to engage the tab 73a of the sausage 73, which tab 73a is a portion of the casing torn at a predetermined angle so that engagement of said tab 73a between the brushes 28 and 29 causes progressive tearing of the casing in a helical form around the sausage 73 in accordance with the rotation and lead of the sausage as is passes through our means for producing frankfurters.

The casing, after being removed from the sausage, is drawn through the duct 40 by vacuum, as shown best in Figure 3 of the drawings. Connected to the extending end of the shaft 2 is a gear 31 having gear teeth 31a and 31b meshing with the gears 30 and 32 respectively as shown best in Figures 1 and 5 of the drawings. These gears 30, 31 and 32 are interposed between plate partitions 1h and 1k of the frame 1 as shown best in Figure 1 of the drawings, which plates 1h and 1k are provided with openings similar to the opening 1g in the plate partition 1f of the frame 1 for the passage of sausage therethrough. Connected with the gear 30 is the secondary shaft 3 over which is positioned the hollow shaft 4. Secured on the secondary shaft 3 is the plate 5a of the clutch 5. This plate 5a bears against the lining 5b of the clutch 5 which engages the plate 5c of said clutch 5 secured on the hollow shaft 4, all as shown best in Figure 1 of the drawings. The plate 5a of the clutch 5 is engaged by semi-circular shoes 5d and 5e engaged by trunnions 5f and 5g connected to the yoke 5h secured to the lever 7, all as shown best in Figures 1 and 12 of the drawings. It will be noted that the shoes 5d and 5e operate in an annular groove 5j in the hub of the plate 5 which is fixed to the secondary shaft 3. The yoke 5h connected to the lever 7 is operated by the solenoid 8. The solenoid 8 is provided with a reciprocally mounted core 8a engaging slotted portions 6a in the lever 6 to the opposite sides of which are connected the bearing plates 9 and 10. Extending through the lever 6 is a bolt 6b, pivotly supporting said lever 6 to said bearing plates 9 and 10, and extending through the lever 7 is a bolt 7a pivotly securing said bearing plates 9 and 10 to said lever 7. The overtravel springs 11 are connected to the levers 6 and 7 by means of the pins 6c and 7b respectively, as shown best in Figures 11 and 13 of the drawings. The lever 7 is pivotly mounted to the frame 1 by means of the pin 7c, slightly offset from the axis of the secondary shaft 3, providing leverage on the trunnion portions 5f and 5g, as shown in Figure 12 of the drawings. It will be noted that the pins 6c form an integral part of the trunnions 5g which are revolubly adjustable to provide the desired amount of leverage required in the operation of the clutch 5. Brackets 1m and 1n support the pins 7c in connection with the end plate 1p of the frame 1. The lever 7 is extended beyond the axis of the secondary shaft 3 and is connected at its extending end to a cam stop actuator 14a by means of the bolt 14b. This cam stop actuator 14a is a cylindrical member having a plunger 14b therein engaged by a spring 14c tending to force said plunger 14b outwardly of the actuator 14a. In connection with the plunger 14b is an extending pin 14d engageable with a stationary cam 14e adapted to cause reciprocal movement of said plunger 14b in said actuator 14b permitting the same to be disengaged from the opening 14f of the cam stop 14. This cam stop 14 is a flat bar provided with a slotted portion 14g in one end located on the bolt 14h, secured to the end plate 1p of the frame 1 by means of the block 1q. This cam stop 14 near its opposite end is slidably mounted on a bolt 14k, and the extended end 14m of this cam stop 14, as shown in Figure 8 of the drawings is arranged to engage the block 12a on the side of the cam 12. The spring 15 tends to hold the cam stop 14 in engagement with the cam 12, and the spring 16 tends to pivot the lever 7 at its extending end toward the cam 12. This cam 12 is secured on the hollow shaft 4 and is a progressively curved cam having a progressively curved surface 12b terminating relatively near the axis thereof at one end and in spaced relation to said one end at its opposite end, whereby a radical step 12c is produced. Engaging the cam 12 is the cam follower 17 which is connected to the end of the ejector plate 18 by the bolt 17a, as shown best in Figures 7 and 8 of the drawings. This bolt 17a extends through one of the end brackets 17b of the ejector plate 18 which are pivotly mounted at their lower ends in connection with the shaft 22 rigidly connected with the frame 1. The spring 21 is connected to the ejector plate 18 at its reinforcing bar 18a, and the opposite end of said spring 21 is connected to the frame 1 by means of the pin 21a, tending to hold said ejector plate 18 toward the ejector plate 19. The ejector plate 19 is curved in cross section as shown in Figure 7 of the drawings and is provided with supporting brackets 19a at its opposite end pivotly mounted on the shaft 22. This ejector plate 19, at its one end, is provided with a catch portion 19b arranged to engage the latch 50, which is a gravity actuated pivoted latch mounted on the bolt 50a in connection with the plate portion 1r, as shown best in Figures 1 and 7 of the drawings. As shown in Figure 6 of the drawings, the spring 20 interconnects the brackets 18b and 19a of the ejector plates 18 and 19 respectively, tending to hold the same together. The frame 1 is provided with an inclined plate 1f adjacent the curved in cross section ejector plate 19 for receiving sausages and conducting the same to the chains 60, 16 and 62, as shown best in Figures 1, 6 and 7 of the drawings. It will be here noted that the ejector plates 18 and 19 are substantially co-extensive between the partition plates 1k and 1r of the frame 1 as shown best in Figure 1 of the drawings and are adapted to receive sausage thereon passing through the hole 1t in the partition plate 1k, all as shown best in Figures 1 and 5 of the drawings. Positioned over the ejector plates 18 and 19 is a guide plate 71. This guide plate 71, as shown in Figures 6 and 7 of the drawings, is provided with a pair of spaced guide portions 71a and 71b intermediate which sausages pass along the upper side of the ejector plate 18 when in the position as shown in Figure 6 of the drawings. Positioned above this guide plate 71 is a rail 72 on which the switch 25 is longitudinally mounted for setting the switch arm 37 at the desired distance from the partition 1k of the frame 1 for regulating the length of sausages cut by the knife 13 adjacent said partition plate 1k. The switch 25 is a micro-switch and is operated by pivotal movement of the lever 37, having an engaging shoe 37a pivotly mounted thereon which is adapted to be abutted by sausages passing between the guide portions 71a and 71b of the guide plate 71. The switch 25 is electrically connected with the solenoid 8 and is a normally open switch arranged to be closed and to energize the solenoid 8 when the lever 37 is pivoted toward the partition 1r of the frame 1 by engagement of the sausage therewith. The trip levers 51 and 52 are rigidly connected to the shaft 3 which is stationarily pivotly mounted in connection with the frame 1 intermediate the partition plates 1k and 1r. The trip lever 51 is provided with a knife edge portion 51a at its lower edge in alignment with the opening 1t in the partition plate 1k, and this trip lever 51 is arranged to engage sausages passing through said opening 1t onto the ejector plate 18 intermediate the guide portions 71a and 71b of the guide plate 71. The trip lever 52, at its end portion 52a as shown in Figure 7 of the drawing, engages the latch 50 holding the same in engagement with the catch portion 19b of the ejector plate 19. This trip lever 52 is also provided with a cam portion 52b engageable with the striker 18c of the ejector plate 18 for opening the switch 24 which is maintained in closed position when said trip levers 51 and 52 are in the downward position as shown in Figures 6 and 7 of the drawings. Switch 24 is provided with a plunger 24a operated by the lever 24b, fixed on the shaft 23 to which said trip levers 51 and 52 are secured. Thus, the switch 24 is a normally open switch maintained in closed position by gravitation of the trip levers 51 and 52, which rotate the shaft 23. This switch 24 is electrically connected with the solenoid 8 and arranged to electrically energize the same when the trip levers 51 and 52 are pivoted into the downward position as shown in Figs. 6 and 7 of the drawings. The spring 38, shown in Figure 1 of the drawings and in Figure 8 of the drawings, tends to cause downward pivotal movement of the trip levers 51 and 52 and aids gravitation thereof for insuring positive downward movement of said trip levers 51 and 52 when disengaged from sausages passing over the ejector plate 18. The knife 13 on the hollow shaft 4, adjacent the partition plate 1k of the frame 1, is arranged to be rotated about the axis of the hollow shaft 4 and pass over the opening 1t in the frame plate 1k of the frame 1 for shearing off sausages projecting through said opening which have contacted the engaging shoe 37a of the lever 37 in connection with the switch 25. This knife 13 is a progressively curved knife arranged to provide progressive shearing of a sausage projecting through said opening 1t, providing very smooth cuts, thus assuring square ends on the sausages sheared thereby. The chains 66, 67, and 68 operate adjacent the inclined plate 1s as shown in Figures 6 and 7 of the drawings, for receiving the sausages after they have been cut off by the knife 13 and ejected by the ejector plate 19. The chain 66 is mounted on sprockets 60 and 63 fixed on the shafts 58 and 59 respectively, the chain 67 is mounted on sprockets 61 and 64 fixed on the shafts 58 and 59 respectively, and the chain 68 is mounted on sprockets 62 and 65 on the shafts 58 and 59 respectively, all as shown best in Figures 1 and 7 of the drawings. It will be here noted that the sprockets 62 and 65 are keyed to the shafts 58 and 59 respectively and are slidably movable longitudinally of said shafts 58 and 59 for adjusting the laterally spaced relationship of the chains 67 and 68. It will be noted that the heating element 70 is an electrical heating element and is provided with a carriage 70a slidable longitudinal of the shafts 58 and 59 so that said heating element may be placed adjacent the chain 68 on which the sausages are conveyed. The heating element 69 is stationarily located in spaced parallel relationship with the chain 66 all as shown best in Fig. 1 of the drawings. The shaft 58 is operated in connection with the ratchet wheel 55 and said shaft 58 is supported in connection with the frame 1 by means of brackets 57. The ratchet wheel 55 is provided with teeth 55a engageable with the pawl 56 which is a spring loaded pawl movable on the lever 53 actuated by the link 54 bearing on an eccentric pin 54a in connection with the gear 32 meshing with the gear 31 on the main shaft 2. Each revolution of the gear 32 operates the eccentric pin 54 about the axis of the gear 32 shifting the lever 53 sufficiently to engage the pawl 56 with the next adjacent tooth 55a on the ratchet wheel 55, thus the shaft 58 and the shaft 59 are rotated by means of the pawl and ratchet 56 and 55 respectively.

The operation of our means for producing frankfurters is substantially as follows:

A long section of sausage 73 as shown in Fig. 14 of the drawings, is provided with a conventional casing and the end portion of said sausage 73 is exposed by tearing a tab 73a from the casing in helical disposition, all as shown in Fig. 14 of the drawings. The long section of sausage so prepared is then placed on the rollers 26 with the tab 73a adjacent the opening 1g in the frame plate 1f of the frame 1. When the long section of sausage engages the rollers 26, rotation of said sausage is caused simultaneously to the forward movement thereof toward the partition 1f. The angular disposition of the rollers 26 simultaneously create forward movement with the rotation of said sausage and force the same adjacent the edge 1e of the inclined plate portion 1b of the frame 1, as indicated by dash lines A in Fig. 2. As the sausage progresses through the opening 1g in the frame plate 1f it passes through the rollers 41, 43 and 45 wherein the roller 41 bears gravitationally on said sausage creating firm engagement therewith and forcing the same against the rollers 43 and 45, it being noted that the leading edges of the rollers 41, 43 and 45 are receptive to the sausage at the trough portions 47a of the roller frame 47 and that the roller 41 is chamfered so that the sausage may slightly raise the same in passing thereunder. Frictional bearing of the rollers 43 and 45 on the main shaft 2 causes positive rotation and feed of the sausage longitudinally of the axis of the shaft 2 whereby the tab portion 73a of the casing on the sausage 73 is fed into adjacent position relatively to the brushes 28 and 29. These brushes 28 and 29 are revolving slightly faster than the sausage and the forward lead of the sausage does not cause the same to pass the brushes before a complete rotation thereof, so that the tab 73a is positively wiped into and between the brushes 28 and 29 causing the casing to tear from the sausage in a helical form and be drawn outwardly through the duct by vacuum and disposed of. The bare sausage then passes under the roller 42 which is similar to the roller 41 and is compressed against the rollers 44 and 46 which feed the sausage onwardly through the openings in the partitions 1h and 1k. As the sausage emerges from the partition 1k it passes under the trip lever 51 which is cammed upwardly by said sausage engaging the knife edge 51a thereof which is a relatively abrupt V-shaped edge. The end of the sausage then progresses along over the ejector plate 18 intermediate the guide portions 71a and 71b of the guide plate 71 until it contacts the shoe 37a of the lever 37 which causes said lever 37 to pivot and close the switch 25 energizing the solenoid 8 causing retraction of the core 8a thereof. Retraction of said core 8a pivots the lever 7 on the pins 7c camming the clutch 5 closed which simultaneously retracts the cam stop 14 permitting the hollow shaft 4 to rotate carrying the knife 13 past the opening 1t in the partition 1k shearing off the sausage. Simultaneous retraction of the ejector plates 18 and 19 is accomplished by engagement of the cam follower 17 with the cam 12 at its furtherest radially disposed portion. It will be herenoted that retraction of the ejector plates 18 and 19 is simultaneous, due to the tension of the spring 20, tending to hold said plates together so that they both pivot about the axis of the shaft 22 in unison as shown best in Fig. 6 of the drawings. This permits the sausage to fall downwardly on the concave surface of the ejector plate 19 and pass upon the chains 66, 67 and 68 intermediate the hook portions 68a thereof as shown best in Fig. 7 of the drawings. It will be herenoted that each sausage requires but a single revolution of the hollow shaft 4 for operating the cam 12 as well as said knife 13. Limitation of the rotational movement of the hollow shaft 4 is accomplished by the cam stop member 14 engaging the stop portion 12a on the cam 12. As the lever 7 is moved toward the frame plate 1t, the pin portions 14d engage the cam portion 14e retracting the plunger 14b from the opening 14f in said cam stop member 14. Thus, the cam stop member 14 is retracted out of interference with the stop portion 12a of the cam 12, then is released automatically as the plunger portion 14b passes outwardly of the whole 14f caused by retraction of said plunger portion 14b by said cam 14e. The cam stop member 14 is then automatically returned to its position in interfering relation with the stop 12a of the cam 12 for limiting rotation thereof while the plunger of the solenoid 8 remains retracted and the lever 7 continues engagement of the clutch 5.

With the ejection of the sausage from its position adjacent the lever 37, a switch 25 is reopened and sausage under the trip lever 51 holds the switch 24 open until the end of said sausage again contacts the lever 37. It will be herenoted that the advance of the sausage past the trip lever 51 is fast enough to raise the trip lever 51 before the cam 12 is rotated more than one revolution. Thus, during normal operations only the switch 25 is operated for energizing the solenoid 8 by means of the switch arm 37. When the end of the sausage passes the trip lever 51 it pivots downwardly rotating the shaft 23 and closes the switch 24. Advance of the next oncoming sausage follows the trailing end of the foregoing sausage and when said switch 24 is closed, the solenoid 8 is operated causing another cycle of operation of the knife 13 which cuts off the leading stub end of the oncoming sausage. As the trip lever 51 drops at the end of the foregoing sausage forwardly of the oncoming sausage, it engages the latch 50 contacting the catch portion 19b of the ejector plate 19. Securely holding the same against pivotal relation about the axis of the shaft 22 and permitting the ejector plate 18 to move independently of the ejector plate 19 whereby the short end of the foregoing sausage and the stub end of the oncoming sausage fall downwardly between the ejector plates 18 and 19 below the guide portions 71a and 71b of the guide plate 71. Thus, the short ends and rounded ends of the sausages are eliminated during progressive cutting operations thereon as they proceed longitudinally through the opening 1t in the partition plate 1k of the frame 1, all as shown best in Fig. 1. As the sausages are cut they gravitate on to the chains 66, 67 and 68 from the inclined plate 1f of the frame 1. It will be herenoted that length of the sausages may be varied by shifting the switch 25 together with the switch arm 37 longitudinally of the rail 72, and the chain 8 may be likewise shifted longitudinally of the machine in order to accommodate various lengths of sausage. The heating element 70 may be moved in unison with the chain 68 so that it will be in close proximity to the adjacent end of the sausage being carried on the chains 66, 67 and 68 for properly steering the same while being moved slowly by means of the ratchet wheel 55 and pawl 56 engaging the same operated by the lever 53 and link 54 eccentrically connected with the gear 32. Thus, it will be noted that the sausages are delivered from our means for producing frankfurters and these sausages will be of a certain length as predetermined having square ends and will all be straight and properly seared on the ends providing certain uniformity desirable for packaging and consumption.

Our method for producing frankfurters is substantially as follows:

The sausage casings are first stuffed in the conventional manner by a conventional stuffing machine and are prepared in relatively long lengths preferably in equal divisions of the original casing lengths when filled which are approximately 32 feet long. Thus, a 16 foot section of such sausage in a casing may be hung at its middle portion over an S-hook and completely processed, which includes the conventional drying, smoking and cooking operations. Also, the necessary chilling process. Processing the sausage in long lengths eliminates the necessity of linking the same, permits very simple handling equipment to be used and eliminates considerable labor in the handling of sausages while the removal of the sausage skin or casing by our means for producing frankfurters as hereinbefore described eliminates the labor required in stripping the skin from the sausage. The skin is continually stripped from the long lengths of sausage in helical form and is a considerable contrast to the removal of skin by manual operation from individual short sections of sausage. After the skin has been mechanically removed from the sausage, it is cut into short lengths having square ends, and the sausage is in straight condition after which the ends are seared, and then the sausage may be packed in suitable containers for delivery to the consumer. Concisely, our method for producing frankfurters includes the stuffing of sausage in long casings, then processing said sausage by cooking the same in said long casings, then stripping the casing from the sausage in helical ribbon like form, and then cutting the sausage into uniform lengths having square ends, then searing the ends of the sausage.

Though we have shown and described a particular construction combination and arrangement of parts and portions, and a certain method, we do not wish to be limited to this particular construction, combination and arrangement, nor to the particular method, but desire to include in the scope of our invention the construction, combination and arrangement and the method substantially as set forth in the appended claims.

Having thus described our invention, what we claim as new and desire to secure by Letters Patent is:

1. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage.

2. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes.

3. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes, an intermittently operated knife in the path of said sausage arranged to cut the same in certain predetermined lengths.

4. In a means for producing frankfurters, the combination of a main shaft, a plurality of rollers driven in angularly disposed relationship to said main shaft and resting thereon, adapted to support a long section of sausage thereon and longitudinally feed and rotate said sausages, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes, an intermittently operated knife in the path of said sausage arranged to cut the same in certain predetermined lengths, an intermittently operated clutch in connection with said knife for rotating the same at certain intervals.

5. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes, an intermittently operated knife in the path of said sausage arranged to cut the same in certain predetermined lengths, an intermittently operated clutch in connection with said knife for rotating the same at certain intervals, a switch arm arranged to be abutted by said sausage for electrically operating said clutch and actuating said knife.

6. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes, an intermittently operated knife in the path of said sausage arranged to cut the same in certain predetermined lengths, an intermittently operated clutch in connection with said knife for rotating the same at certain intervals, a switch arm arranged to be abutted by said sausage for electrically operating said clutch and actuating said knife, a trip lever adjacent said knife, switch means in connection with said trip lever for electrically operating said clutch when short ends of sausage pass said trip lever, whereby adjacent ends of on-coming sausages are cut off.

7. In a means for producing frankfurters, the combination of a main shaft, a plurality of rollers driven in angularly disposed relationship to said main shaft and resting thereon, adapted to support a long section of sausage thereon and longitudinally feed and rotate said sausage, and a pair of counter rotating brushes in axial alignment with the path of said sausage on said rollers adapted to engage the skin on said sausage and strip the same therefrom in helical form, whereby said skin is removed in one piece from said long section of sausage, second rollers engageable with said shaft disposed on an acute angle to the axis thereof in the path of said sausage, and third rollers adapted to bear on said sausage and force the same into engagement with said second mentioned rollers for positive rotation and longitudinal feed of said sausage past said brushes, an intermittently operated knife in the path of said sausage arranged to cut the same in certain predetermined lengths, an intermittently operated clutch in connection with said knife for rotating the same at certain intervals, a switch arm arranged to be abutted by said sausage for electrically operating said clutch and actuating said knife, a trip lever adjacent said knife, switch means in connection with said trip lever for electrically operating said clutch when short ends of sausage pass said trip lever, whereby adjacent ends of oncoming sausages are cut off, ejector plates near said knife, synchronously operated therewith for ejecting said sausages after being cut in certain short lengths.

8. In a means for producing frankfurters of the class described, a plurality of parallel rollers, guide means at an acute angle to said rollers arranged to guide sausage being driven longitudinally thereof by said rollers, and a pair of counter rotating brushes adjacent said rollers arranged to engaged skin of sausage for stripping the same therefrom in single ribbon like helical form, a rotary knife beyond said brushes, a switch arm beyond said knife in spaced relationship therewith adapted to be contacted by said sausage, a switch in connection with said switch arm, a solenoid electrically connected with said switch, and a clutch operated by said solenoid for intermittently operating said knife for cutting off short sections of said sausage when contacted with said switch arm.

9. In a means for producing frankfurters of the class described, a plurality of parallel rollers, guide means at an acute angle to said rollers arranged to guide sausage being driven longitudinally thereof by said rollers, and a pair of counter rotating brushes adjacent said rollers arranged to engage skin of sausage for stripping the same therefrom in single ribbon like helical form, a rotary knife beyond said brushes, a switch arm beyond said knife in spaced relationship therewith adapted to be contacted by said sausage, a switch in connection with said switch arm, a solenoid electrically connected with said switch, and a clutch operated by said solenoid for intermittently operating said knife for cutting off short sections of said sausage when contacted with said switch arm, second power driven rollers engaging said sausage in opposed relationship to each other for positively driving the same in spaced relation to each other at opposite ends of said brushes.

10. In a means for producing frankfurters of the class described, a plurality of parallel rollers, guide means at an acute angle to said rollers arranged to guide sausage being driven longitudinally thereof by said rollers, and a pair of counter rotating brushes adjacent said rollers arranged to engage skin of sausage for stripping the same therefrom in single ribbon like helical form, a rotary knife beyond said brushes, a switch arm beyond said knife in spaced relationship therewith adapted to be contacted by said sausage, a switch in connection with said switch arm, a solenoid electrically connected with said switch, and a clutch operated by said solenoid for intermittently operating said knife for cutting off short sections of said sausage when contacted with said switch arm, second power driven rollers engaging said sausage in opposed relationship to each other for positively driving the same in spaced relation to each other at opposite ends of said brushes, a vacuum duct communicating intermediate said brushes for carrying away said ribbon like casing, after being removed from said sausage.

11. In a means for producing frankfurters of the class described, a plurality of parallel rollers, guide means at an acute angle to said rollers arranged to guide sausage being driven longitudinally thereof by said rollers, and a pair of counter rotating brushes adjacent said rollers arranged to engage skin of sausage for stripping the same therefrom in single ribbon like helical form, a rotary knife beyond said brushes, a switch arm beyond said knife in spaced relationship therewith adapted to be contacted by said sausage, a switch in connection with said switch arm, a solenoid electrically connected with said switch, and a clutch operated by said solenoid for intermittently operating said knife for cutting off short sections of said sausage when contacted with said switch arm, second power driven rollers engaging said sausage in opposed relationship to each other for positively driving the same in spaced relation to each other at opposite ends of said brushes, a vacuum duct communicating intermediate said brushes for carrying away said ribbon like casing, after being removed from said sausage, a common shaft for said clutch and said knife, a cam in connection with said shaft, a pair of pivoted ejector plates arranged to support said sausage when contacting said switch arm, a follower in connection with one of said ejector plates adapted to operate at the periphery of said cam, whereby each operative movement of said knife is followed by movement of said ejector plate for ejecting the sausage cut off by said knife adjacent said switch arm.

12. In a means for producing frankfurters of the class described, a plurality of parallel rollers, guide means at an acute angle to said rollers arranged to guide sausage being driven longitudinally thereto by said rollers, and a pair of counter rotating brushes adjacent said rollers arranged to engage skin of sausage for stripping the same therefrom in single ribbon like helical form, a rotary knife beyond said brushes, a switch arm beyond said knife in spaced relationship therewith adapted to be contacted by said sausage, a switch in connection with said switch arm, a solenoid electrically connected with said switch, and a clutch operated by said solenoid for intermittently operating said knife for cutting off short sections of said sausage when contacted with said switch arm, second power driven rollers engaging said sausage in opposed relationship to each other for positively driving the same in spaced relation to each other at opposite ends of said brushes, a vacuum duct communicating intermediate said brushes for carrying away said ribbon like casing, after being removed from said sausage, a common shaft for said clutch and said knife, a cam in connection with said shaft, a pair of pivoted ejector plates arranged to support said sausage when contacting said switch arm, a follower in connection with one of said ejector plates adapted to operate at the periphery of said cam, whereby each operative movement of said knife is followed by movement of said ejector plates for ejecting the sausage cut off by said knife adjacent said switch arm, chain conveyor means outwardly of said ejector plates for receiving said sausage and heating elements adjacent said conveyor chains for searing opposite ends of said sausage.

13. In a means for producing frankfurters of the class described the combination of a plurality of angularly disposed rollers, guide means positioned at an acute angle to said roller arranged to guide long sections of sausages whereby rotation of said rollers feeds said sausages longitudinally and rotates the same, a rotary knife, a shaft for said rotary knife, a clutch on said shaft, switch means in spaced relation to said rotary knife engageable with said sausage, a solenoid operatively connected with said clutch and said switch, whereby contact of said switch by said sausage actuates said solenoid operating said clutch which rotates said knife, a pair of ejector plates pivotally mounted below said switch over which said sausage travels, trip levers pivotally mounted over said ejector plates, one of said trip levers adjacent said knife for contacting short ends of sausage, a second switch in connection with said trip lever electrically connected with said solenoid, whereby the contact of a short end of said sausage actuates said second switch for operating said knife and cutting off said short end of sausage, latch means engageable with one of said ejector plates controlled by one of said trip levers for holding one of said ejector plates stationarily, cam means in connection with said shaft for intermittently shifting the other of said ejector plates permitting short ends of sausage to fall between said ejector plates.

14. In a means for producing frankfurters of the class described the combination of a plurality of angularly disposed rollers, guide means positioned at an acute angle to said roller arranged to guide long sections of sausages whereby rotation of said rollers feeds said sausages longitudinally and rotates the same, a rotary knife, a shaft for said rotary knife, a clutch on said shaft, switch means in spaced relation to said rotary knife engageable with said sausage, a solenoid operatively connected with said clutch and said switch, whereby contact of said switch by said sausage actuates said solenoid operating said clutch which rotates said knife, a pair of ejector plates pivotally mounted below said switch over which said sausage travels, trip levers pivotally mounted over said ejector plates, one of said trip levers adjacent said knife for contacting short ends of sausage, a second switch in connection with said trip lever electrically connected with said solenoid, whereby the contact of a short end of said sausage actuates said second switch for operating said knife and cutting off said short ends of sausage, latch means engageable with one of said ejector plates controlled by one of said trip levers for holding one of said ejector plates stationarily, cam means in connection with said shaft for intermittently shifting the other of said ejector plates permitting short ends of sausage to fall between said ejector plates, said ejector plate engaged by said latch adapted to move beyond the path of said sausage when said first mentioned switch is contacted, and a ramp outwardly of said ejector plate engaged by said latch for relieving proper sections of sausage from our means for producing frankfurters.

EDGAR R. McCLURE.
ANDREW L. McCLURE.

REFERENCES CITED

The following references are of record in the file of this patent:

UNITED STATES PATENTS

| Number | Name | Date |
| --- | --- | --- |
| 2,013,610 | Karpiloff | Sept. 3, 1935 |
| 2,043,132 | Vogt | June 2, 1936 |
| 2,171,196 | Trabold | Aug. 29, 1939 |
| 2,182,211 | Paddock | Dec. 5, 1939 |
| 2,340,755 | Jacobson | Feb. 1, 1944 |